Patented June 20, 1950

2,511,880

UNITED STATES PATENT OFFICE 2,511,880

RESINS OF ALKYL-SUBSTITUTED CYCLO-ALKANOL ESTERS OF ACRYLIC ACIDS

Chessie E. Rehberg, Glenside, and Charles H. Fisher, Abington, Pa., assignors to the United States of America as represented by the Secretary of Agriculture No Drawing. Original application March 29, 1946, Serial No. 658,200. Divided and this application March 29, 1949, Serial No. 84,258

6 Claims. (Cl. 260—89.5)

(Granted under the act of March 3, 1883, as amended April 30, 1928; 370 O. G. 757)

This application is made under the act of March 3, 1883, as amended by the act of April 30, 1928 and the invention herein described, if patented in any country, may be manufactured and used by or for the Government of the United States of America for governmental purposes throughout the world without the payment to us of any royalty thereon.

This application is a division of our application Serial No. 658,200 filed March 29, 1946, Patent 2,473,544, issued June 21, 1949.

This invention relates to esters of acrylic and substituted acrylic acids wherein the acid is esterified with a cyclic aliphatic alcohol, and to resins comprising the polymers or copolymers of such esters. The preferred resins are polymers (including copolymers in this term) of a polyalkyl substituted cycloalkanol ester of an acid of the formula $CH_2=CRCOOH$ wherein R is hydrogen, a lower alkyl radical, or halogen, the polyalkyl substituted cycloalkanol having from 5 to 16 carbon atoms.

We have discovered that cycloalkanols and substituted cycloalkanols can be esterified with acrylic acid and substituted acrylic acids either directly or indirectly, and that the resulting esters can be polymerized either alone or with other polymerizable compounds, to produce resins having unique and valuable properties.

It is well known that the normal alkyl acrylate polymers have poor water resistance when the alkyl group is small, that is, when it contains 1 to 5 carbon atoms. Furthermore, although the water resistance is improved when the alkyl group is larger, the polymers are too soft and tacky for many purposes.

We have discovered that the advantages of the large alkyl group in acrylic esters may be retained without sacrificing the strength and toughness of the lower alkyl acrylates by the use of esters having preferably 6 to 16 carbon atoms in the alkyl radical, provided that there is a cycloaliphatic ring structure in the alkyl group. Thus, normal hexyl acrylate polymer is a very soft, weak, sticky resin, whereas cyclohexyl acrylate polymer is a strong, tough, elastic material resembling the polymer of methyl acrylate in physical appearance and consistency, but having much better water resistance than polymethyl acrylate. Similarly, normal nonyl acrylate polymer is very soft and weak and is exceedingly sticky and tacky, while on the other hand, 3,3,5-trimethyl cyclohexyl acrylate, having the same number of carbon atoms in the alkyl radical, produces a strong, rigid, water-resistant polymer.

In the normal alkyl series of acrylic ester polymers the resins become softer, weaker, and more tacky, or sticky, as the size of the alkyl group is increased from 1 to 16 carbon atoms. In sharp contrast to this tendency, the cycloalkyl acrylate polymers increase in hardness, strength, and water resistance as more and more alkyl radicals are substituted into the cycloalkyl ring. Thus, the following order of increasing hardness and strength has been observed in the acrylic ester polymers: cyclohexyl, methylcyclohexyl, and trimethylcyclohexyl.

We prefer to prepare the cycloalkyl esters of acrylic or methacrylic acid by the alcoholysis of a lower-boiling ester of the acid, such as the methyl or ethyl ester, in the presence of a suitable catalyst and in the presence of a polymerization inhibitor, preferably as illustrated by the examples given below.

The monomeric esters may be polymerized alone, mixed with other esters of the same type, or mixed with other compounds containing one or more polymerizable double bonds. Thus, the monomeric esters may be mixed in any proportion with other monomers such as other esters of acrylic, methacrylic, chloroacrylic, or other substituted acrylic acid, vinyl esters, styrene, and so forth, and the mixture may be caused to polymerize by application of heat, light, or a catalyst such as an organic peroxide, a per-salt, oxygen, ozone, or oxygen-liberating compound. The polymerization may be carried out in any known manner which is suitable for acrylic esters and may be in aqueous emulsion, in organic solvent, or in mass. Suitably, a temperature of 50° to 120° C. and a catalyst concentration of 0.01 to 2.0 percent may be used.

In common with other acrylic resins, the polymers produced from monomers having only one reactive double bond are thermoplastic and are soluble in many organic solvents, while those produced from monomers containing two or more polymerizable double bonds are infusible and insoluble in all organic solvents.

The preparation and polymerization of the cycloalkyl esters are illustrated by the following examples:

EXAMPLE I.—CYCLOHEXYL ACRYLATE

*Preparation of monomer*

Three hundred parts (all parts by weight) of cyclohexanol, 1,032 parts of methyl acrylate (monomeric), 25 parts of diamylhydroquinone, and 9 parts of sulfuric acid were mixed in a 2-liter, round-bottom, 2-neck flask fitted with a capillary bubbler tube through one neck. A slow stream of carbon dioxide was led in through the capillary. The flask was fitted to a 3-foot fractionating column having at its top a total-condensation, variable take-off still head. The mixture was boiled under total reflux until the temperature of the vapor at the still-head fell to 63° C. At this temperature the methanol, methyl acrylate binary azeotrope was distilled as rapidly as the methanol was produced by the alcoholysis of the methyl acrylate, the rate of distillation being so controlled that the temperature at the still-head did not rise above 63° to 64° C. When the reaction was complete and no more methanol was produced, the excess methyl acrylate was distilled under 140 mm. pressure. Finally, the cyclohexyl acrylate was distilled at 62° C. under 5.1 mm. pressure and amounted to 357 parts, or 77 percent of the theoretical. It had $N_D^{20}$, 1.4600 and $d_4^{20}$, 0.9796.

*Polymerization of cyclohexyl acrylate*

Fifty parts of monomeric cyclohexyl acrylate, 100 parts of water, 2 parts of Tergitol #4 liquid, 1 part of Triton 720 and 0.01 part of ammonium persulfate were mixed in a flask fitted with a mechanical stirrer and heated by a boiling water bath. After 30 minutes no polymerization was evident; so another 0.01 part of catalyst was added. Polymerization proceeded smoothly and was apparently complete after 1 hour. After 3 hours, the stirrer was removed and steam was introduced through a tube passing to the bottom of the flask. After 30 minutes the escaping steam had no odor of monomer; so the emulsion was cooled and broken by addition of 10 percent solution of sodium chloride. After washing to remove the salts, the polymer was dried and molded in a press heated with 50-pound steam and with a pressure of 5,000 p. s. i. for a time of 10 minutes. The sheet thus obtained was clear, colorless, flexible, and tough and was harder than polymethyl acrylate.

EXAMPLE II.—OTHER CYCLOALKYL ACRYLATES

Using substantially the procedure described in the first part of Example I, the following monomeric cycloalkyl esters were prepared from the appropriate alcohol and ester. Tergitol No. 4 has the structure

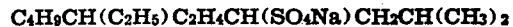

$C_4H_9CH(C_2H_5)C_2H_4CH(SO_4Na)CH_2CH(CH_3)_2$ whereas Triton 720 is the sodium salt of aryl alkyl polyether sulfonate.

*Table 1.—Monomeric cycloalkyl esters*

| Ester | Yield, percent theoretical | B. P., °C. (mm. press) | $N_D^{20}$ | $d_4^{20}$ |
|---|---|---|---|---|
| o-Methylcyclohexyl acrylate | 70 | 69(5) | 1.4560 | .9546 |
| m-Methylcyclohexyl acrylate | 78 | 70(4.6) | 1.4550 | .9541 |
| p-Methylcyclohexyl acrylate | 85 | 55(1.3) | 1.4548 | .9528 |
| p-tert.-Amylcyclohexyl acrylate | 85 | 97(1.0) | 1.4705 | .9490 |
| p-Cyclohexylcyclohexyl acrylate | 86 | 105(0.1) | 1.4775 | .9500 |
| 2,4-diamylcyclohexyl acrylate | 42 | 104(0.2) | 1.5000 | .9308 |
| 3,3,5-trimethylcyclohexyl acrylate | 89 | 72(2.1) | 1.4550 | .9292 |
| 3,3,5-trimethylcyclohexyl methacrylate | 88 | 79(1.1) | 1.4560 | .9255 |
| Hydroabietyl acrylate |  | 177(0.3) | 1.5172 | 1.0181 |

These monomers were polymerized as in Example I. The polymers of the methylcyclohexyl acrylates were all harder than that of cyclohexyl acrylate and had higher brittle-points than the latter. The polymer of 3,3,5-trimethyl-cyclohexyl acrylate was much harder than that of the monomethyl substituted esters, its brittle-point being 48° C. The polymer of 3,3,5-trimethylcyclohexyl methacrylate was harder than that of the acrylate and did not soften in boiling water. Thus, although the hardness of the polymers of the normal alkyl acrylates decreases as the number of carbon atoms in the alkyl group is increased, the hardness of the polymers of cycloalkyl acrylates increases with increasing substitution in the ring (which increases the number of carbon atoms in the alkyl group). For this reason it is possible to prepare acrylic resins containing large alkyl groups, and hence having excellent water resistance, and yet increasing their hardness and strength rather than decreasing them.

EXAMPLE III.—COPOLYMERIZATIONS OF CYCLOALKYL ESTERS

The following mixtures of monomers were placed in stoppered test tubes and left at room temperature and exposed to normal room lighting for 72 hours.

A. Cyclohexyl acrylate, 10 parts; methacrylic acid, 10 parts; benzoyl peroxide, 0.05 part.
B. 3,3,5-trimethylcyclohexyl acrylate, 12 parts; styrene, 8 parts; benzoyl peroxide, 0.05 part.
C. 3,3,5 - trimethylcyclohexyl methacrylate, 16 parts; methacrylonitrile, 4 parts; benzoyl peroxide, 0.05 part.

After 72 hours, B had polymerized completely and A had a small amount of polymer in it. All were placed in an oven at 50° C., and 24 hours later A had produced a white, frothy, hard, rigid mass, while B and C had produced clear, colorless, bubble-free, hard, rigid castings. A did not soften in boiling water, while B softened at 65° C. and C at 88° C.

It is apparent that other monomer, other proportions, other catalysts, and other procedures, all of which are well known to one skilled in the art, may be used in producing copolymers containing cycloalkyl acrylates.

It is to be understood, of course, that this invention is not limited to the details described in the examples above. The esters may be prepared by other known methods, such as by the action of the appropriate acid, acid anhydride, or acid halide on the cycloalkanol with or without the use of esterification catalysts such as mineral acids. Other esterification catalysts may be used, such as halogen acids, sulfonic acids, alkali metal hydroxides or alcoholates, or other known catalysts. Similarly, other methods or catalysts may be used in the polymerization of the monomeric esters. Also, the monomeric esters may be polymerized alone or mixed with other acrylic or methacrylic esters, vinyl compounds, styrene, or other polymerizable compounds.

The alcohols applicable here include cyclohexanol, alkylcyclohexanols, hydrogenated naphthols, hydrogenated abietyl alcohol, cyclopentanols, cyclohexyl methanol, beta-cyclohexyl ethanol, and halogenated derivatives thereof.

Cross-reference is made to co-pending Rehberg and Fisher application, Serial No. 543,933, filed July 7, 1944, now Patent 2,445,925, disclosing a process of preparing acrylates such as the cyclohexyl and p-methylcyclohexyl acrylate from the methyl acrylate and the corresponding cyclohexanol.

Having thus described our invention, we claim:

1. A resin comprising a polymer of an ester of a polyalkyl substituted cyclohexanol having no more than 16 carbons atoms and unsubstituted acrylic acid.
2. A resin comprising a polymer of 3,3,5-trimethylcyclohexyl acrylate.
3. A resin comprising a polymer of 3,3,5-trimethylcyclohexyl methacrylate.
4. A resin comprising a polymer of a tri-alkyl substituted cyclohexanol ester of unsubstituted acrylic acid.
5. A resin comprising a polymer of a tri-alkyl substituted cyclohexanol ester of methacrylic acid.
6. A resin comprising a polymer of a poly-alkyl substituted cycloalkanol ester of an acid of the formula $CH_2=CRCOOH$ wherein R is a member of the group consisting of hydrogen, a lower alkyl radical, and halogen, the polyalkyl substituted cycloalkanol having from 5 to 16 carbon atoms.

CHESSIE E. REHBERG.
CHARLES H. FISHER.

REFERENCES CITED

The following references are of record in the file of this patent:

UNITED STATES PATENTS

| Number | Name | Date |
| --- | --- | --- |
| 2,473,544 | Rehberg et al. | June 21, 1949 |